UNITED STATES PATENT OFFICE.

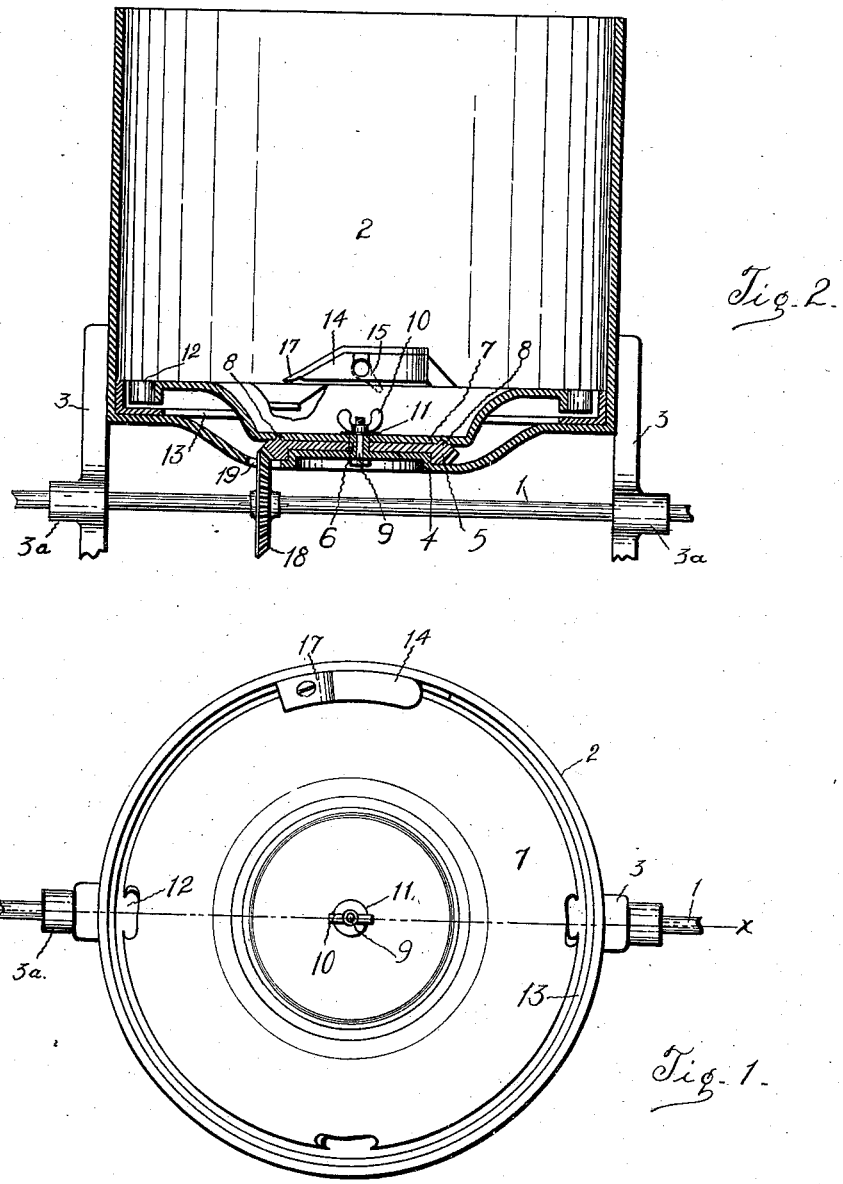

WILLIAM A. WILSON, OF DALLAS, TEXAS.

PEANUT-PLANTER.

1,072,552.

Specification of Letters Patent.

Patented Sept. 9, 1913.

Application filed February 8, 1913. Serial No. 747,073.

*To all whom it may concern:*

Be it known that I, WILLIAM A. WILSON, a citizen of the United States, residing at Dallas, in the county of Dallas and State of Texas, have invented certain new and useful Improvements in Peanut-Planters, of which the following is a specification.

My invention relates to peanut planters and particularly to that class of peanut planters which discharge the peanuts singly from the seed-cans by employing feed-wheels provided with peripheral cells each proportioned to receive a single peanut.

One of the main difficulties in planting double kerneled peanuts in the shell arises in the fact that such peanuts frequently assume a vertical position in the feed-wheel cells, and when they are brought into contact with the separator or cut off in such a position, the kernels are crushed and their germination is prevented.

The object of the invention is to provide a special form of separator for a peanut planter, which separator will be formed with a cutting edge which will cut in two any vertically disposed double kerneled peanut, so that the two kernels will not be injured, and may be separately planted.

A further object is to provide an improved spring pressed ejector for discharging the peanuts from the cells of the feed wheel within the separator.

Finally, the object of the invention is to provide a device of the character described, that will be strong, durable, simple and efficient, and comparatively easy to construct, and also one that will not be likely to get out of working order.

With these and various other objects in view, my invention has relation to certain novel features of the construction and operation, an example of which is described in the following specification, and illustrated in the accompanying drawings, wherein:

Figure 1 is a plan view of the seed can of a planter showing the herein described invention correlated with the feed wheel in said can. Fig. 2 is a vertical sectional view taken upon the line $x$—$x$ of Fig. 1. Fig. 3 is a detail side view of the separator, a portion of the same being broken away to show the ejector.

Referring now more particularly to the drawing; wherein like reference characters designate similar parts in all the figures, the numeral 1 denotes the axle of a peanut planter and 2 denotes a seed can mounted a short space above the axle 1, said axle having a diametral relation to the bottom of the can. The seed can is supported in its proper vertical position by a pair of opposite bracket members 3 which also form bearings 3ª receiving the axle. The bottom of the seed can is formed with a central circular raised portion 4 which forms a seat for a bevel gear 5, the under face of said gear being recessed to receive said portion 4 of the bottom. Integral with the bottom of the can at the center thereof, an upstanding boss 6 is formed, which boss passes through a central aperture in the gear 5, and also projects through the center of a feed wheel 7, seated upon the gear 5. A unity of rotation between the members 5 and 7 is established by providing the former member with a pair of diametrally opposite lugs 8, received by suitable recesses in the under surface of the latter. A bolt 9, passing through the boss 6 is provided upon its threaded upper end with a wing-nut 10 which clamps a washer 11 against the top of said boss, thereby preventing any upward displacement of the feed wheel 7, such as might disengage said member from the gear 5. The periphery of the feed wheel is formed with a plurality of equidistant cells 12, so proportioned as to each accommodate a peanut.

Upon the outer portion of the bottom of the seed can, there is secured a ring 13 of angular form in cross-section, the vertical flange of said ring being contiguous with the cylindrical wall of the can. The diameter of the feed wheel is such that its rim is closely adjacent to the flange portion of the ring 13, so that said portion acts as the outer wall of each cell 12. It is also to be noted that the rim portion of the feed wheel is so spaced from the horizontal portion of the ring 13, that said portion acts as a bottom to said cells.

A description will now be given of the separator within which the peanuts are ejected from the seed cans.

The separator consists of a housing 14 carried by the ring 13 and overhanging the rim portion of the feed wheel, so that during the rotation of said wheel the cells 12 must pass beneath said housing. Within said housing is mounted an ejector consisting of a pivoted spring-pressed arm 15, the free end of which bears normally downward upon a peripheral portion of the feed-plate. As each cell passes through the separator during the rotation of the feed wheel, the ejector will enter the cell and throw the peanut out of the same. A gap is formed in the ring 13 beneath the housing 14 to permit the peanuts to pass through an aperture 16 in the bottom of the seed can.

The numeral 17 designates a sharp blade formed upon one end of the housing 14 just above the rim of the feed wheel, said blade being adapted to sever any double kerneled peanut which occupies a vertical position in one of the cells 12 as said cell approaches the separator.

A bevel gear 18 mounted fast upon the axle of the machine has engagement with the gear 5, an aperture 19 being provided in the bottom of the seed can to permit such engagement.

From the foregoing description, the operation of the device is apparent.

As the planter travels along a furrow a constant rotation will be communicated from the axle to the feed wheel 7 due to the intermeshing of the gears 5 and 18. The rotation of the feed wheel will cause a peanut to settle in each of the cells 12, either in a flat or upright position. In the former case the peanut will be carried into the separator housing and will be there ejected from the seed can by the member 15. In the latter case the blade 17 will cut the peanut in two and the halves, each containing a kernel will be separately ejected from the seed can.

The above described construction may be subjected to various modifications and changes without departing from the spirit or sacrificing the advantages of the invention, and the device is therefore presented as including all such modified forms as properly come within the scope of the following claims.

What I claim is:

1. In a device of the character described, the combination with a seed can, of a feed-wheel mounted in the bottom thereof, means for communicating rotation to the feed-wheel, a housing overhanging the periphery of the feed-wheel and having a rigid relation to the seed can, the bottom of the can being apertured beneath said housing, and a blade at one end of said housing, disposed just above the feed-wheel, and adapted to sever any peanut standing on end in a cell of the wheel.

2. In a device of the character described, the combination with a seed can, of a feed-wheel mounted in the bottom thereof means for communicating rotation to the feed wheel, a housing overhanging the periphery of the feed-wheel and having a rigid relation to the seed can, the bottom of the can being apertured beneath said housing, a spring pressed ejector within the housing adapted to force the peanuts from the cells of the feed-wheel as said cells pass through said housing, and a blade at one end of said housing disposed just above the feed-wheel and adapted to sever any peanut standing on end in a cell of the wheel.

3. In a peanut planter, a seed can having a dished bottom provided with a discharge opening at one side, a ring fitting on the bottom of the seed can and having an opening over the opening of the can bottom, a housing carried by the ring over its opening, a cutter blade mounted at one end of the housing in advance of the ring opening, a dish-shaped rotatable plate mounted over the bottom of the seed can and having its marginal portion overhanging the ring, the plate having peripheral seed pockets adapted to pass under the housing in close proximity to the cutter blade, and a spring pressed ejector arm bearing on the plate in the path of the pockets.

In testimony whereof I have signed my name to this specification in the presence of two subscribing witnesses.

WILLIAM A. WILSON.

Witnesses:
J. S. MURRAY,
D. B. CARR.